US011484893B2

(12) United States Patent
Li

(10) Patent No.: US 11,484,893 B2
(45) Date of Patent: Nov. 1, 2022

(54) COATING HEAD OF MIST COATING FILM FORMATION APPARATUS AND MAINTENANCE METHOD OF SAME

(71) Applicant: TOSHIBA MITSUBISHI-ELECTRIC INDUSTRIAL SYSTEMS CORPORATION, Chuo-ku (JP)

(72) Inventor: Tianming Li, Chuo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 524 days.

(21) Appl. No.: 16/613,315

(22) PCT Filed: May 31, 2017

(86) PCT No.: PCT/JP2017/020298

§ 371 (c)(1),
(2) Date: Nov. 13, 2019

(87) PCT Pub. No.: WO2018/220756

PCT Pub. Date: Dec. 6, 2018

(65) Prior Publication Data

US 2020/0171514 A1 Jun. 4, 2020

(51) Int. Cl.
*B05B 7/00* (2006.01)
*B05C 15/00* (2006.01)
(Continued)

(52) U.S. Cl.
CPC ................ *B05B 1/044* (2013.01); *B05B 7/26* (2013.01); *B05B 15/55* (2018.02); *B05B 17/06* (2013.01); *B05B 1/28* (2013.01)

(58) Field of Classification Search
CPC ........... B05B 1/044; B05B 15/55; B05B 7/26; B05B 17/06; B05B 1/28
(Continued)

(56) References Cited

U.S. PATENT DOCUMENTS 5,336,320 A * 8/1994 Hogan ................. H05K 3/0091 239/584
7,395,788 B2 * 7/2008 Jacobsson ................. F01P 7/04 123/41.58
2017/0274410 A1 9/2017 Shirahata et al.

FOREIGN PATENT DOCUMENTS

CN 205673106 U 11/2016
CN 206139411 U 5/2017
(Continued)

OTHER PUBLICATIONS

International Search Report dated Aug. 29, 2017 in PCT/JP2017/020298 filed on May 31, 2017.
(Continued)

*Primary Examiner* — Davis D Hwu
(74) *Attorney, Agent, or Firm* — Xsensus LLP

(57) ABSTRACT

According to an embodiment of the invention, a coating head of a mist coating film formation apparatus including a main body is provided. The main body includes a top plate in which a supply port capable of supplying one of a cleaning liquid or a mist of a source material solution is provided, a bottom plate provided below the top plate in a vertical direction, and a sidewall provided between the top plate and the bottom plate; and the sidewall includes an upper end and a lower end connected respectively to the top plate and the bottom plate and forms an interior space with the top plate and the bottom plate. The sidewall includes a slit spraying the mist externally from the interior space, and a recovery port capable of recovering the supplied cleaning liquid or a mist coalescing in the interior space. The bottom plate includes a slope having a height becoming lower from an inner perimeter of the sidewall toward the recovery port.

8 Claims, 8 Drawing Sheets

(51) Int. Cl.

| | |
|---|---|
| ***B05B 1/04*** | (2006.01) |
| ***B05B 15/55*** | (2018.01) |
| ***B05B 17/06*** | (2006.01) |
| ***B05B 7/26*** | (2006.01) |
| *B05B 1/28* | (2006.01) |

(58) Field of Classification Search
USPC .......................................................... 118/300
See application file for complete search history.

(56) References Cited

FOREIGN PATENT DOCUMENTS

| | | | |
|---|---|---|---|
| JP | 2003-98699 | A | 4/2003 |
| JP | 2005-313046 | A | 11/2005 |
| TW | 387280 | | 4/2000 |
| TW | 394708 | | 6/2000 |
| WO | 2016/051559 | A1 | 4/2016 |

OTHER PUBLICATIONS

Taiwanese Office Action dated Mar. 16, 2018 in Taiwanese Application No. 106125283 (with partial English translation), citing references AP and AQ therein, 9 pages.

Office Action dated Sep. 16, 2021, in corresponding Korean patent Application No. 10-2019-7035075, 7 pages.

Korean Office Action dated Mar. 16, 2021 in Korean Application No. 10-2019-7035075.

Partial Office Action dated Oct. 30, 2020, in corresponding Chinese patent Application No. 201780091374.0 with English translation attached, 10 pages.

Chinese Office Action dated Oct. 13, 2021, in Chinese patent Application No. 201780091374.0.

Partial Office Action dated Jun. 17, 2021, in corresponding Chinese patent Application No. 201780091374.0, 3 pages.

* cited by examiner

6/8

COATING HEAD OF MIST COATING FILM FORMATION APPARATUS AND MAINTENANCE METHOD OF SAME

TECHNICAL FIELD

The embodiment of the invention relates to a coating head of mist coating film formation apparatus and a maintenance method of same.

BACKGROUND ART

A mist coating film formation apparatus includes a coating liquid atomization mechanism, a mist coating mechanism, and a baking/drying mechanism. The coating liquid atomization mechanism obtains a coating liquid mist having a liquid droplet form by atomizing a coating liquid including a prescribed source material inside an atomizing container by utilizing an ultrasonic vibrator. The mist coating mechanism includes a placement portion where a substrate that is the film formation object is placed. The mist coating mechanism supplies the coating liquid mist generated by the coating liquid atomization mechanism to the substrate, and coats the coating liquid mist onto the surface of the substrate. The baking/drying mechanism forms a thin film including the prescribed source material on the surface of the substrate by baking/drying the coating liquid mist coated onto the surface of the substrate.

Such a mist coating film formation apparatus can uniformly form a thin film having a film thickness of 1 μm or less.

A spray coating apparatus (e.g., referring to Patent Literature 1), a spin coating apparatus, and the like are coating apparatuses that form liquid droplets of a coating liquid. The spin coating apparatus forms a thin film on the substrate surface by causing high-speed rotation of a liquid droplet of the coating liquid supplied to the surface central portion of the substrate. The spray coating apparatus forms a thin film on the substrate surface by spraying the coating liquid onto the substrate using a high-pressure air-gas.

The mist coating film formation apparatus differs from the spray coating apparatus or the like in that a thin and uniform thin film is formed by straightening the flow of the mist inside the coating head and coating the mist onto the surface of the substrate.

Because the mist coating film formation apparatus straightens the flow of the mist inside the coating head, the source material solution accumulates inside the coating head. If the source material solution is disposed as-is, the yield substantially decreases, which causes a cost increase.

Also, when different thin films are formed by changing the source material solution, it is necessary to remove the accumulated source material solution. To this end, the coating head must be dismantled and cleaned; the work man-hours increase; and the throughput of the manufacturing of the thin film decreases.

PRIOR ART DOCUMENT

Patent Document

[Patent Document 1] JP-A 2003-098699 (Kokai)

SUMMARY OF INVENTION

Problem to be Solved by the Invention

The embodiment is directed to provide a coating head of a mist coating film formation apparatus and a maintenance method of the coating head in which the yield and the throughput are improved.

Means for Solving the Problem

According to an embodiment of the invention, a coating head of a mist coating film formation apparatus including a main body is provided. The main body includes a top plate in which a supply port capable of supplying one of a cleaning liquid or a mist of a source material solution is provided, a bottom plate provided below the top plate in a vertical direction, and a sidewall provided between the top plate and the bottom plate; and the sidewall includes an upper end and a lower end connected respectively to the top plate and the bottom plate and forms an interior space with the top plate and the bottom plate. The sidewall includes a slit spraying the mist externally from the interior space, and a recovery port capable of recovering the supplied cleaning liquid or a mist coalescing in the interior space. The bottom plate includes a slope having a height becoming lower from an inner perimeter of the sidewall toward the recovery port.

Effects of the Invention

According to the coating head of the embodiment, the bottom plate includes the slope having the height becoming lower from the inner perimeter of the sidewall toward the recovery port; therefore, the cleaning liquid or the accumulated source material solution can be recovered easily. Accordingly, the yield and the throughput of the coating head of the embodiment can be improved.

MODES FOR CARRYING OUT THE INVENTION

Figure 1:
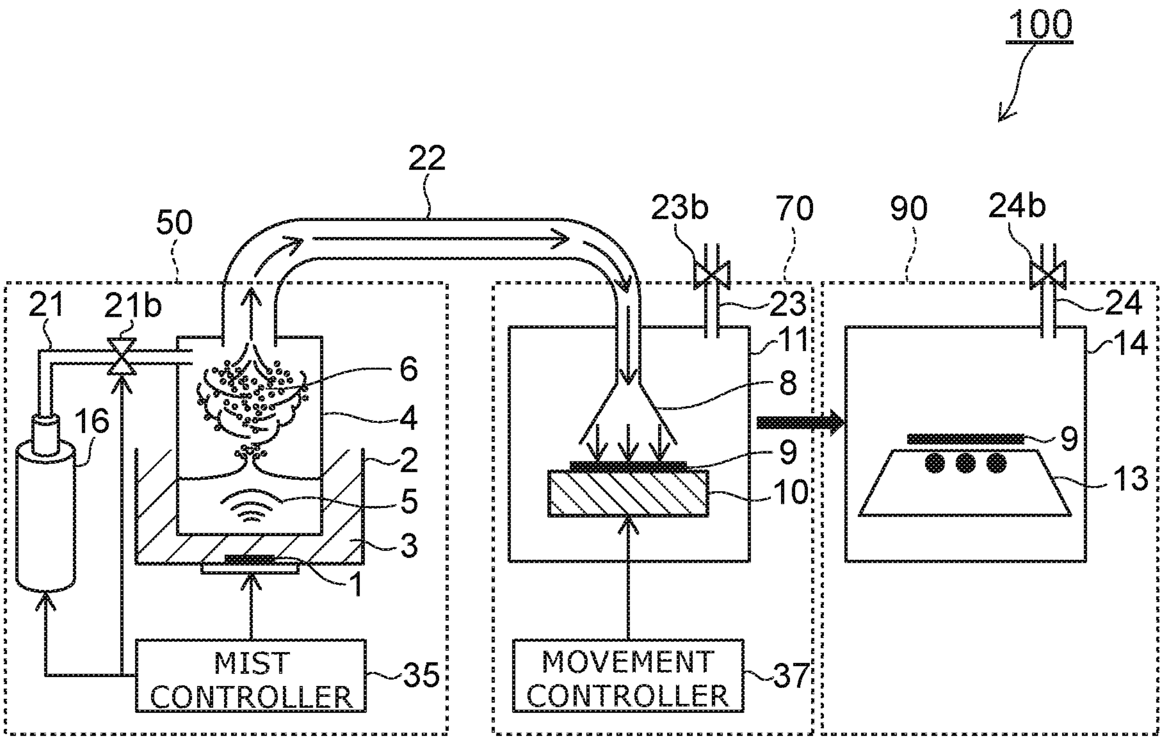
FIG. 1 is a schematic descriptive view illustrating a mist coating film formation apparatus according to an embodiment.

Various embodiments are described below with reference to the accompanying drawings.

The drawings are schematic and conceptual; and the relationships between the thicknesses and widths of portions, the proportions of sizes among portions, etc., are not necessarily the same as the actual values. Further, there are also cases where the dimensions and/or the proportions are illustrated differently between the drawings, even in the case where the same portion is illustrated.

In the specification and drawings, components similar to those described previously or illustrated in an antecedent drawing are marked with the same reference numerals; and a detailed description is omitted as appropriate.

FIG. 1 is a schematic descriptive view illustrating a mist coating film formation apparatus according to the embodiment. As shown in FIG. 1, the mist coating film formation apparatus 100 of the embodiment includes a source material solution nebulization mechanism 50, a mist coating mechanism 70, and a baking/drying mechanism 90 as major components.

The source material solution nebulization mechanism 50 performs source material solution mist generation processing. The source material solution nebulization processing generates a source material solution mist 6 by nebulizing (atomizing). By utilizing an ultrasonic vibrator 1 generating an ultrasonic wave, a source material solution 5 that is fed into a nebulizing container 4 can be nebulized into liquid droplets having a median particle size of about 4 μm and a narrow particle size distribution (a standard deviation σ of not more than ±20%). The source material solution mist 6 is transferred to the mist coating mechanism 70 via a mist supply line 22 by a carrier gas supplied from a carrier gas supplier 16.

In the source material solution nebulization mechanism 50, for example, the ultrasonic vibrator 1 oscillates at a frequency set within a range of 1.5 to 2.5 MHz. Water 3 is introduced to a water tank 2 provided on the ultrasonic vibrator 1 as a medium of ultrasonic wave propagation. By driving the ultrasonic vibrator 1 at the set oscillation frequency, the source material solution 5 that is fed to the nebulizing container 4 is nebulized (atomized).

A low-viscosity source material solution is assumed as the source material solution 5. The low-viscosity source material solution is diluted using a solvent such as acetone, methyl ethyl ketone, methylene chloride, methanol, toluene, water, hexane, methyl acetate, ethyl acetate, vinyl acetate, ethyl chloride, etc.

A case is considered where the source material solution 5 is a nanoparticle dispersion solution. In such a case, for example, a silver nanoparticle dispersion solution, a zirconium oxide dispersion solution, a cerium oxide dispersion solution, an indium oxide dispersion solution, a tin oxide dispersion solution, a zinc oxide dispersion solution, a titanium oxide dispersion solution, a silica dispersion solution, or an alumina dispersion solution is considered; and the source material solution 5 is obtained by these solutions being diluted by the solvent recited above.

On the other hand, a case is considered where the source material solution 5 is a nanofiber dispersion solution. In such a case, for example, a carbon nanotube dispersion solution, a silver nanofiber dispersion solution, or a cellulose nanofiber dispersion solution is considered; and the source material solution 5 is obtained by these solutions being diluted by the solvent recited above.

The carrier gas that is supplied from the carrier gas supplier 16 is supplied into the nebulizing container 4 from a carrier gas introduction line 21. Thereby, the source material solution mist 6 that has the liquid droplet form nebulized in the interior space of the nebulizing container 4 is transported toward a coating head 8 of the mist coating mechanism 70 via the mist supply line 22.

The carrier gas mainly includes nitrogen gas or air and transfers the source material solution mist 6. The carrier gas flow rate is controlled to 2 to 10 (L/min) by a mist controller 35. A valve 21*b* is a valve for adjusting the carrier gas flow rate. The valve 21*b* is provided in the carrier gas introduction line 21.

The mist controller 35 controls the carrier gas flow rate supplied from the carrier gas supplier 16 by controlling the opening degree of the valve 21*b*. In addition to the control of the carrier gas flow rate, the mist controller 35 controls the switching of the ultrasonic oscillator circuit of the ultrasonic vibrator 1, the switching of an ultrasonic oscillator circuit for an ultrasonic vibrator having a different frequency, etc.

The mist coating mechanism 70 performs source material solution mist coating processing (mist coating processing). The source material solution mist coating processing forms a source material solution liquid film by coating (coating) the source material solution mist 6 supplied via the mist supply line 22 onto the surface of a substrate 9 (a substrate which is the film formation object). In the source material solution mist coating processing, the source material solution mist 6 is supplied from the coating head 8 onto the surface of the substrate 9 (the substrate which is the film formation object) placed on a movable stage 10 (a placement portion).

The baking/drying mechanism 90 performs baking/drying processing. The baking/drying processing is processing that forms, on the surface of the substrate 9, a thin film having the source material included in the source material solution liquid film as a constituent material. In the baking/drying processing, the substrate 9 having the source material solution liquid film formed on the surface is baked/dried on a hotplate 13; and the solvent of the source material solution liquid film is caused to evaporate.

The baking/drying mechanism 90 includes the hotplate 13 provided inside a baking/drying chamber 14 as a major configuration. The substrate 9 that has the source material solution liquid film formed on the surface by the coating of the source material solution mist 6 using the mist coating mechanism 70 is placed on the hotplate 13 inside the baking/drying chamber 14.

The baking/drying processing of the substrate 9 having the source material solution liquid film formed on the surface is performed using the hotplate 13. By the baking/drying processing, the solvent of the source material solution liquid film formed of the coated source material solution mist 6 can be caused to evaporate; and a thin film that has the source material (the prescribed source material) included in the source material solution 5 itself as the constituent material can be formed on the surface of the substrate 9. The solvent vapor of the source material solution 5 generated by the baking/drying processing is released to the atmosphere from an exhaust gas output line 24 after being processed by a not-illustrated exhaust treatment device. The exhaust gas output line 24 is opened and closed by a valve 24*b*.

Although the baking/drying processing is performed using the hotplate 13 in the example shown in FIG. 1, the baking/drying mechanism 90 may be configured to have a form in which hot air is supplied into the baking/drying chamber 14 without using the hotplate 13.

The configuration of the coating head 8 will now be elaborated.

Figure 2:
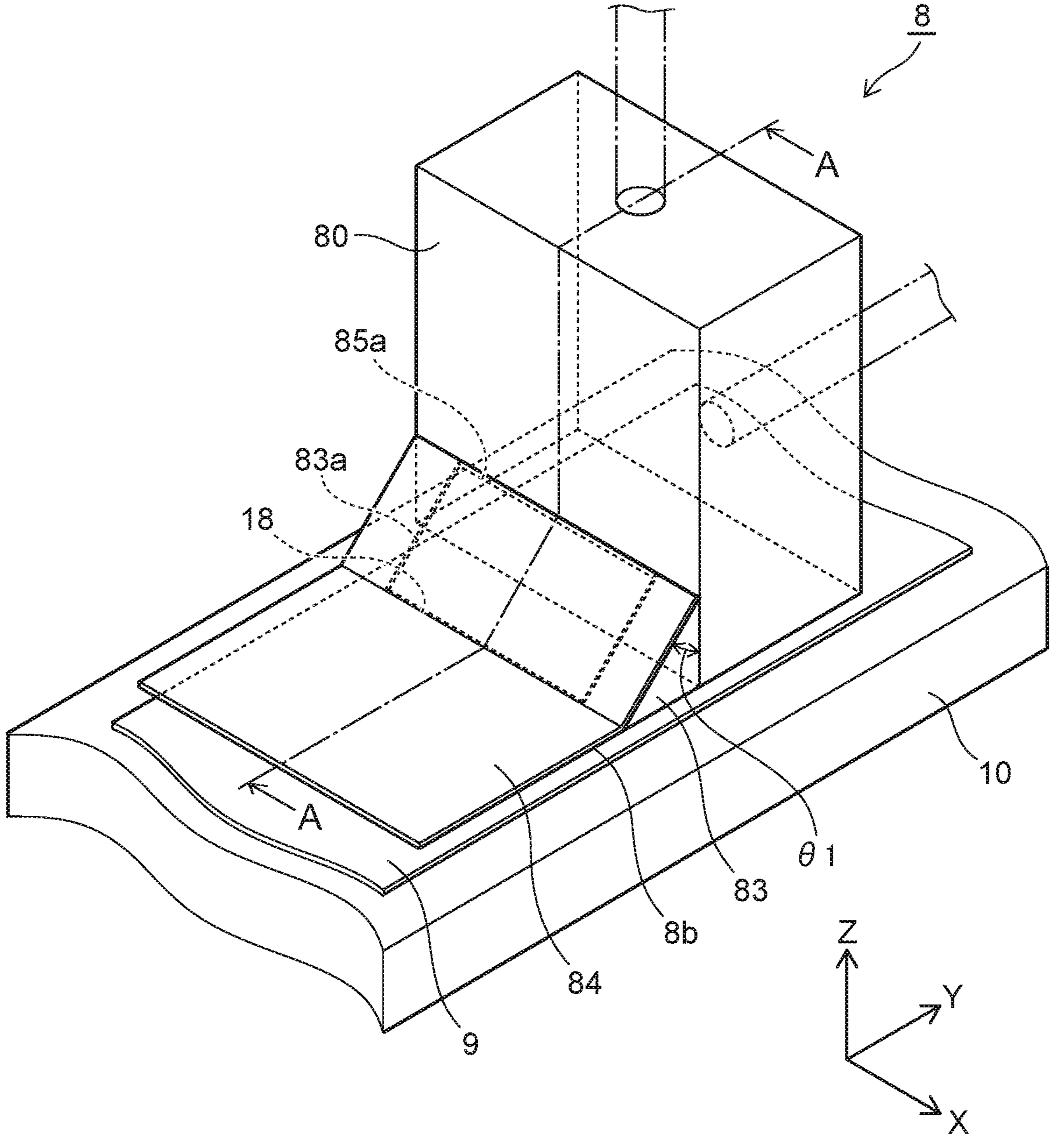
FIG. 2 is a perspective view illustrating the coating head of the embodiment.
Figure 3:
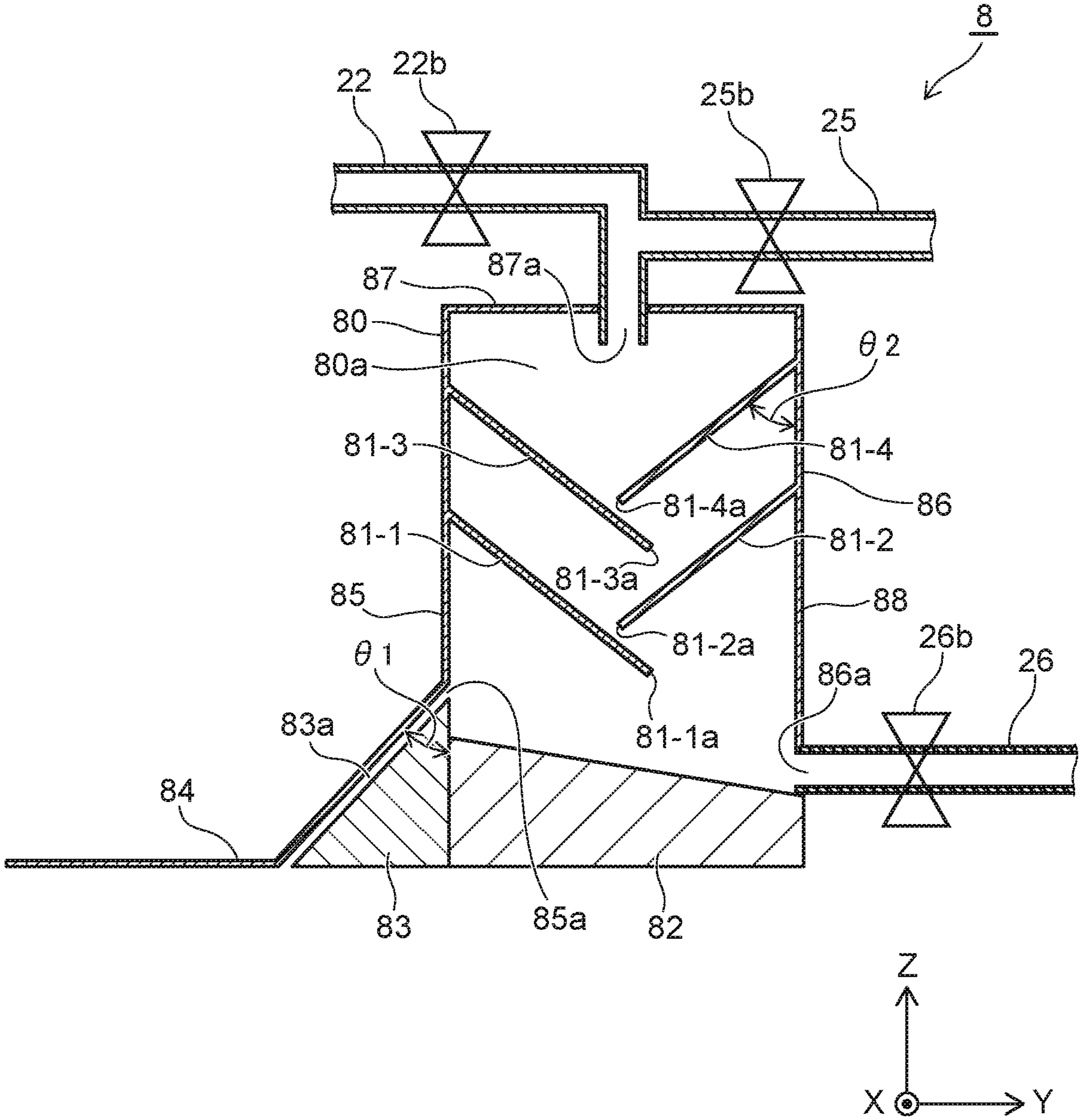
FIG. 3 is an auxiliary cross-sectional view along line AA of FIG. 2.

FIG. 2 is a perspective view illustrating the coating head of the embodiment. FIG. 3 is an auxiliary cross-sectional view along line AA of FIG. 2. FIG. 4A to FIG. 6C are three-view projections illustrating portions of the coating head of the embodiment. FIG. 7 is a partially exploded view illustrating the coating head of the embodiment.

As shown in FIG. 2, the coating head 8 includes a main body 80, a slit block 83, and a slit plate 84. The slit block 83 is connected to the lower side surface of the main body 80. A portion of the slit plate 84 at one end is connected along the slope of the slit block 83; and the remaining portion forms a bottom surface 8*b* of the coating head 8.

A mist outlet 18 that has a slit configuration is provided in the bottom surface 8*b* of the coating head 8. The mist of the source material solution is sprayed from the mist outlet 18. On the other hand, a main body slit 85*a* is provided in the main body 80. A channel is provided in the surface where the slope of the slit block 83 is provided; and the main body slit 85*a* is connected at one end of the channel. The other end of the channel is the mist outlet 18. The upper portion of the channel is covered with a portion of the slit plate 84. A guide channel 83*a* of the mist supplied from the main body slit 85*a* is formed of the channel of the slit block 83 and the portion covered with the slit plate 84.

The mist that is supplied from the main body slit 85*a* is sprayed from the mist outlet 18 via the guide channel 83*a*. The guide channel 83*a* has an angle along the slope of the slit block 83. Therefore, the mist that is supplied from the guide channel 83*a* is sprayed from the mist outlet 18 at an angle $\theta 1$ from the vertical direction.

The substrate 9 is placed so that the surface of the substrate 9 opposes the bottom surface 8*b* of the coating head 8. That is, the substrate 9 is placed under the bottom surface 8*b* of the coating head 8. The mist outlet 18 is provided at the bottom surface 8*b* of the head. The mist outlet 18 is provided in a slit configuration having the longitudinal direction in the direction of the short side of the substrate 9. The formation length of the mist outlet 18 is set to be about the same as the short-side width of the substrate 9.

Three-dimensional coordinates may be used in the description hereinbelow. Namely, the three-dimensional coordinates include an X-axis parallel to the direction in which the slit of the mist outlet 18 extends, a Y-axis parallel to the direction in which the movable stage 10 moves, and a Z-axis which is the vertical direction.

For example, the source material solution mist 6 that is flow-straightened inside the coating head 8 is supplied from the mist outlet 18 while moving the substrate 9 by the movable stage 10 along the Y-axis direction (a direction orthogonal to both the vertical direction and the extension direction of the mist outlet 18). Thereby, the liquid film of the source material solution can be formed on the surface of the substrate 9 by coating the source material solution mist 6 on substantially the entire surface of the surface of the substrate 9. The mist outlet 18 is formed in a slit configuration. Therefore, by adjusting the formation length of the coating head 8 in the longitudinal direction (the X-axis direction; a first direction), the coating head 8 is not limited to the short-side width of the substrate 9 which is the thin film formation substrate and is applicable also to a substrate 9 having a wide short-side width. Specifically, by providing the coating head 8 with a longitudinal-direction width matching the assumed maximum short-side width of the substrate 9, the formation length of the mist outlet 18 can substantially match the maximum short-side width of the substrate 9.

The substrate 9 is placed on the upper portion of the movable stage 10. The movable stage 10 is moved by the control of a movement controller 37 in a state of being separated about 2 to 5 mm from the bottom surface 8*b* of the coating head 8. For example, the movable stage 10 moves in the reverse direction of the positive direction (the negative direction) of the Y-axis. Thereby, the source material solution mist 6 can be coated onto substantially the entire surface of the surface of the substrate 9; and the source material solution liquid film can be formed on the surface of the substrate 9.

At this time, the thickness of the source material solution liquid film can be adjusted by the movement controller (FIG. 1) 37 modifying the movement speed of the movable stage 10.

In other words, the movement controller 37 moves the movable stage 10 along the movement direction (the negative direction of the Y-axis of FIG. 2) matching the transverse direction of the mist outlet 18 of the coating head 8 and performs variable control of the movement speed of the movable stage 10 along the movement direction.

Also, as previously shown in FIG. 1, the coating head 8 and the movable stage 10 are provided inside a mist coating chamber 11. The gas mixture of the carrier gas and the solvent vapor of the source material solution mist 6 volatilized inside the mist coating chamber 11 is released to the atmosphere via an exhaust gas output line 23 after being processed by a not-illustrated exhaust treatment device. A valve 23*b* is a valve provided in the exhaust gas output line 23.

For example, as in the example, the main body 80 has a substantially rectangular parallelepiped configuration. As shown in FIG. 3, the main body 80 includes a top plate 87, a bottom plate 82, and a sidewall 88. The top plate 87 is provided at the upper portion of the main body 80. The top plate 87 is a square plate. The bottom plate 82 is provided at the bottom portion of the main body 80. When projected onto the XY plane, the bottom plate 82 is a rectangular member having substantially the same configuration as the top plate 87. The sidewall 88 is a rectangular frame-like body having substantially the same XY cross-sectional view as the top plate 87 and the bottom plate 82. The sidewall 88 is provided between the top plate 87 and the bottom plate 82. The sidewall 88 is connected to the top plate 87 at the upper end of the sidewall 88 and connected to the bottom plate 82 at the lower end of the sidewall 88.

The main body 80 includes a hollow surrounded with the top plate 87, the sidewall 88, and the bottom plate 82. The hollow inside the main body 80 is a flow-straightening chamber 80*a*.

An opening is provided in the top plate 87. A pipe for the mist supply line 22 and a cleaning liquid/replacement gas supply line 25 is connected fluidly to the opening. The mist, the cleaning liquid, and the replacement gas are supplied via the opening. The opening is a supply port 87*a*.

The sidewall 88 includes a front plate 86 and a back plate 85. The front plate 86 and the back plate 85 are parallel to the XZ plane and are arranged to oppose each other. The front plate 86 and the back plate 85 are plate-like bodies included in the sidewall 88.

An opening is provided below the front plate 86. A pipe for a source material solution recovery line 26 is connected fluidly to the opening. The opening is a recovery port 86*a*. The recovery port 86*a* is at the position of the upper surface of the bottom plate 82 or a position higher than the upper surface of the bottom plate 82.

The main body slit 85*a* is provided in the back plate 85. The longitudinal direction of the main body slit 85*a* is substantially parallel to the X-axis. The main body slit 85*a* is provided at a position higher than the upper surface of the bottom plate 82.

As described below, the coating head 8 can spray the mist substantially regardless of the source material solution accumulating at the bottom plate 82 because the bottom plate 82 includes a slope portion having a height decreasing from the main body slit 85*a* toward the slit recovery port. Accordingly, it is unnecessary to frequently clean or recover the source material solution from the coating head 8; therefore, the manufacturing throughput of the thin film can be improved. Also, because the accumulated source material solution can be re-utilized, a sufficient amount of source material solution can be recovered at the bottom plate 82, which can contribute to increase the yield.

The flow-straightening chamber 80*a* which is the interior space of the main body 80 is partitioned by one or more current plates. In the example, four current plates 81-1 to 81-4 are provided. The current plates 81-1 to 81-4 are provided in this order from bottom to top. The current plates 81-1 to 81-4 each are a rectangular plate having three sides connected to the interior wall of the main body 80. The remaining sides are open respectively at end portions 81-1*a* to 81-4*a*. That is, the flow-straightening chamber 80*a* is partially partitioned by the current plates 81-1 to 81-4; and the space inside the flow-straightening chamber 80*a* is fluidly continuous.

The current plates 81-1 to 81-4 each are provided so that the end portions 81-1*a* to 81-4*a* each are lower in the vertical direction than the other portions. The lowermost current plate 81-1 is provided so that the end portion 81-1*a* of the current plate 81-1 is oriented in the reverse direction of the direction toward where the main body slit 85*a* is provided. Favorably, the direction in which the end portion 81-1*a* extends is a direction parallel to the main body slit 85*a*.

The current plate 81-2 is provided to be adjacent above the current plate 81-1. The plate surface of the current plate 81-1 is disposed perpendicularly downward from the end portion 81-2*a* of the current plate 81-2. The current plate 81-2 is provided so that the end portion 81-2*a* of the current plate 81-2 is oriented in the direction toward where the main body slit 85*a* is provided.

The current plate 81-3 is provided to be adjacent above the current plate 81-2. The plate surface of the current plate 81-2 is disposed perpendicularly downward from the end portion 81-3*a* of the current plate 81-3. The current plate 81-3 is provided so that the end portion 81-3*a* of the current plate 81-3 is oriented in the reverse direction of the direction toward where the main body slit 85*a* is provided.

The current plate 81-4 is provided to be adjacent above the current plate 81-3. The plate surface of the current plate 81-3 is disposed perpendicularly downward from the end portion 81-4*a* of the current plate 81-4. The current plate 81-4 is provided so that the end portion 81-4*a* of the current plate 81-4 is oriented in the direction toward where the main body slit 85*a* is provided.

The distance in the vertical direction between the end portion of a current plate and the current plate disposed adjacently below the current plate is set to about 1 mm to about several mm. For example, the distance is set appropriately according to the source material solution to be nebulized.

Thus, the current plates 81-1 to 81-4 are provided obliquely at an angle θ2 from the vertical direction. The angle 02 is set appropriately to cause flow off with the cleaning liquid, etc., to the bottom plate 82 when the cleaning liquid and/or the replacement gas are introduced. For example, the angle θ2 is set to about 60°.

The mist that is supplied from the supply port 87*a* has its path obstructed by the plate surface of the current plate 81-4, is dispersed in the two-dimensional directions in which the current plate 81-4 spreads, and is supplied to the next current plate 81-3 while being dispersed in the direction in which the end portion 81-4*a* extends. The mist that is dispersed has its path obstructed by the plate surface of the current plate 81-3 and is dispersed further. The mist is dispersed similarly by the current plates 81-2 and 81-1 therebelow and is widely dispersed in the space at the bottom of the flow-straightening chamber 80*a*.

For example, as in the example, the position in the Y-axis direction of the supply port 87*a* may be provided at the end portion vicinity of the current plate, or may be disposed to be offset toward the front plate 86 or the back plate 85 from the end portion according to the degree of the dispersion of the mist.

The dispersed mist is sprayed from the mist outlet 18 via the guide channel 83*a* from the main body slit 85*a*.

When cleaning the coating head 8, the cleaning liquid and/or the replacement gas is supplied from the supply port 87*a*. Because the end portions 81-1*a* to 81-4*a* of the current plates 81-1 to 81-4 each are provided to be lower than the other portions of each of the current plates 81-1 to 81-4, the cleaning liquid and/or the replacement gas that is supplied from the supply port 87*a* can flow downward due to gravity without accumulating on the current plates.

Although a case is described in the description recited above in which four current plates are provided, the current plates are not limited to four; and one to three, five, or more may be provided. In any case, the current plate most proximal to the main body slit 85*a* (positioned lowest) is provided so that the end portion of the current plate is oriented in the reverse direction of the direction toward where the main body slit 85*a* is provided to sufficiently increase the flow-straightening effect of the mist and sufficiently disperse the sprayed mist.

Figure 4A:
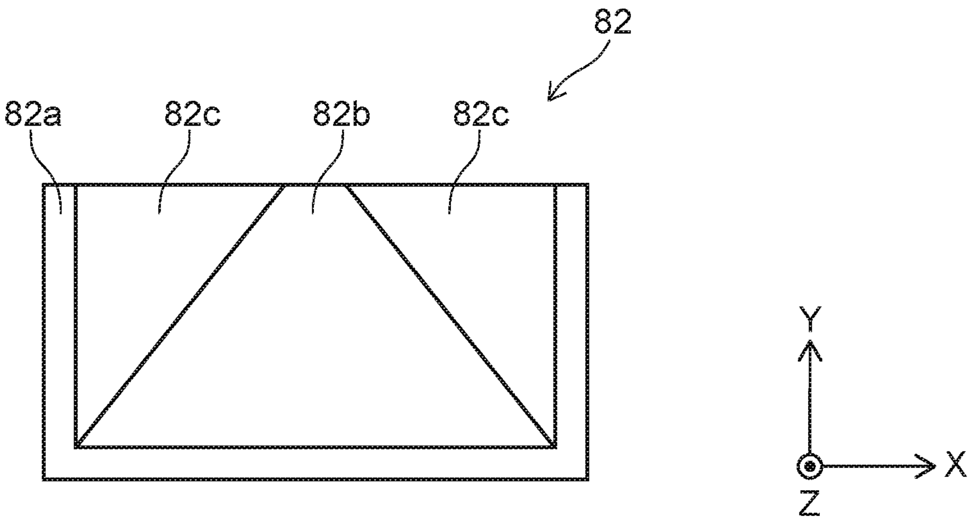
FIG. 4A is a plan view of a three-view projection illustrating a portion of the coating head of the embodiment.
Figure 4B:
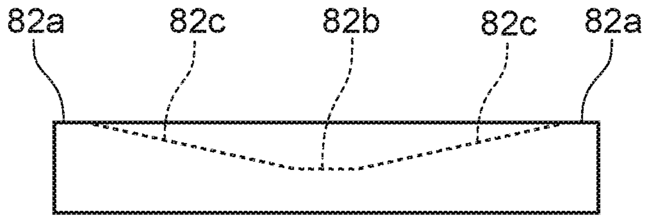
FIG. 4B is a front view of the three-view projection illustrating the portion of the coating head of the embodiment.
Figure 4C:
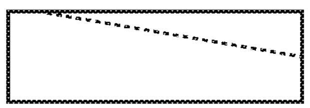
FIG. 4C is a side view of the three-view projection illustrating the portion of the coating head of the embodiment.

As shown in FIG. 4, the bottom plate 82 includes a connection portion 82*a* and slope portions 82*b* and 82*c*. The connection portion 82*a* is formed to surround the three sides of the rectangular bottom plate 82. The connection portion 82*a* surrounds a rectangular plate at the end portions of the slope portions 82*b* and 82*c*. The connection portion 82*a* is connected to the lower end of the sidewall 88 by the flat surface of the upper portion (in the positive direction of the Z-axis). The recovery port 86*a* that connects the source material solution recovery line 26 is connected at one side where the rectangular plate is not surrounded.

The slope portion 82*b* includes a slope having a height that becomes lower from a position opposing the recovery port 86*a* toward the recovery port 86*a*. The slope portion 82*c* includes a slope having a height that becomes lower toward the recovery port 86*a* from the position of the side adjacent to the surface where the recovery port 86*a* is provided.

The dispersed mist that coalesces at the lowermost portion of the flow-straightening chamber 80*a* collects at the bottom plate 82 as the source material solution. The collected source material solution flows off toward the recovery port 86*a* due to the slope portions 82*b* and 82*c* and is therefore recovered via the recovery port 86*a*.

Also, when cleaning the coating head 8, the cleaning liquid that cleans the current plates 81-1 to 81-4 falls onto the bottom plate 82 and flows toward the recovery port 86*a* due to the slope portions 82*b* and 82*c*. The collected cleaning liquid is recovered via the recovery port 86*a*.

Figure 5A:
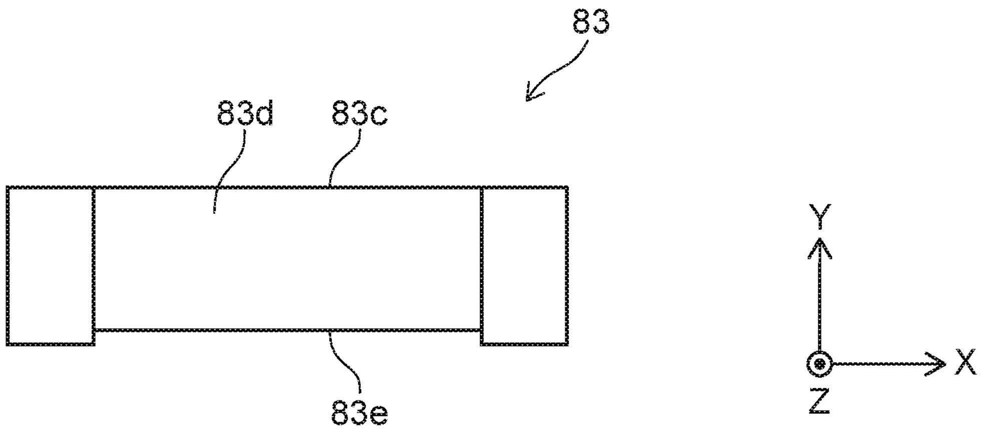
FIG. 5A is a plan view of a three-view projection illustrating a portion of the coating head of the embodiment.
Figure 5B:
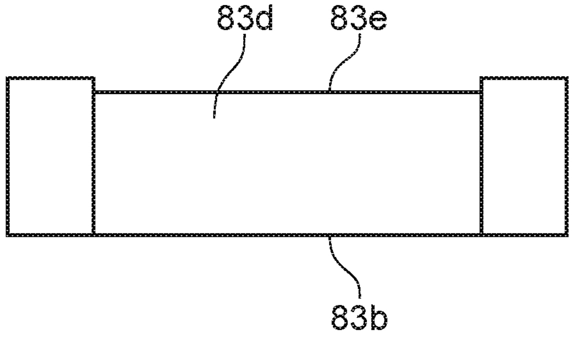
FIG. 5B is a front view of the three-view projection illustrating the portion of the coating head of the embodiment.
Figure 5C:
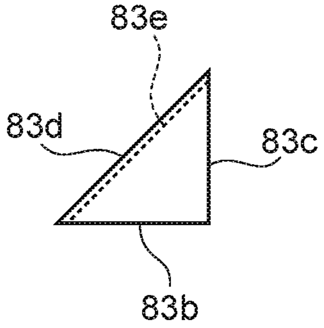
FIG. 5C is a side view of the three-view projection illustrating the portion of the coating head of the embodiment.

As shown in FIG. 5, the slit block 83 is a triangular-prism member extending in the X-axis direction. The triangular-prism member has a surface 83*b* parallel to the XY plane and a surface 83*c* parallel to the XZ plane and orthogonal to the surface 83*b*. The slit block 83 has an oblique surface 83*d* crossing these two surfaces.

The surface 83*b* that is parallel to the XY plane of the slit block 83 forms a portion of the bottom surface 8*b* of the coating head 8 with the slit plate 84. The surface 83*c* that is parallel to the XZ plane of the slit block 83 is connected to the back plate 85.

The slit block 83 includes a channel portion 83*e* parallel to the oblique surface 83*d*. The channel portion 83*e* is formed so that the two ends of the slit block 83 along the X-axis direction remain.

Figure 6C:
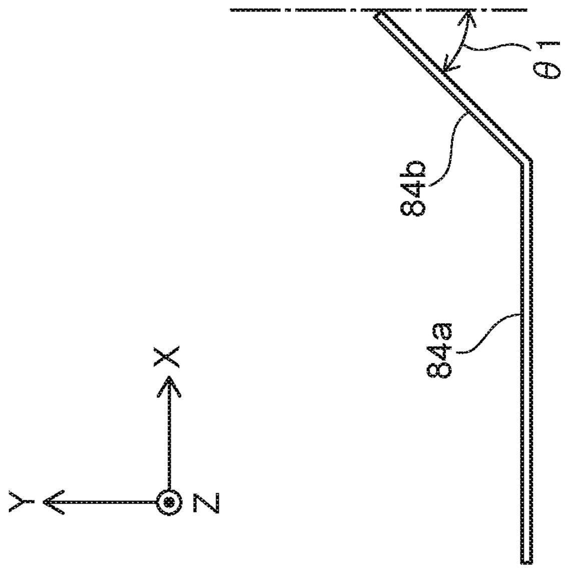
FIG. 6C is a side view of the three-view projection illustrating the portion of the coating head of the embodiment.
Figure 6A:
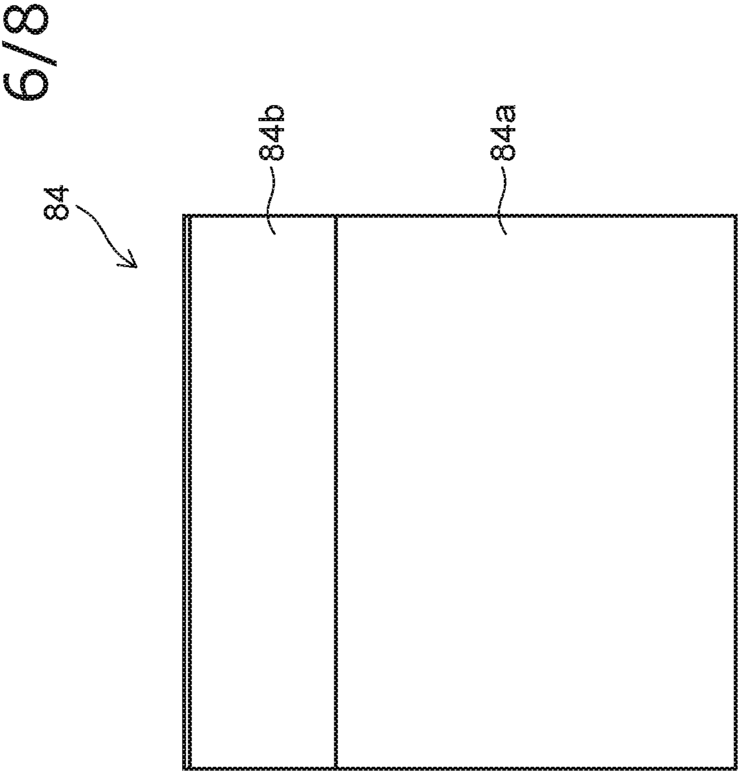
FIG. 6A is a plan view of a three-view projection illustrating a portion of the coating head of the embodiment.
Figure 6B:
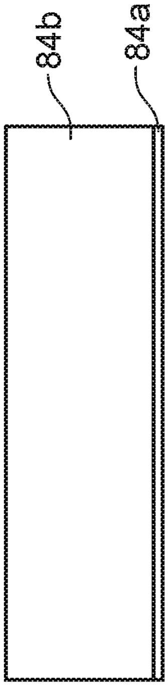
FIG. 6B is a front view of the three-view projection illustrating the portion of the coating head of the embodiment.
Figure 7:
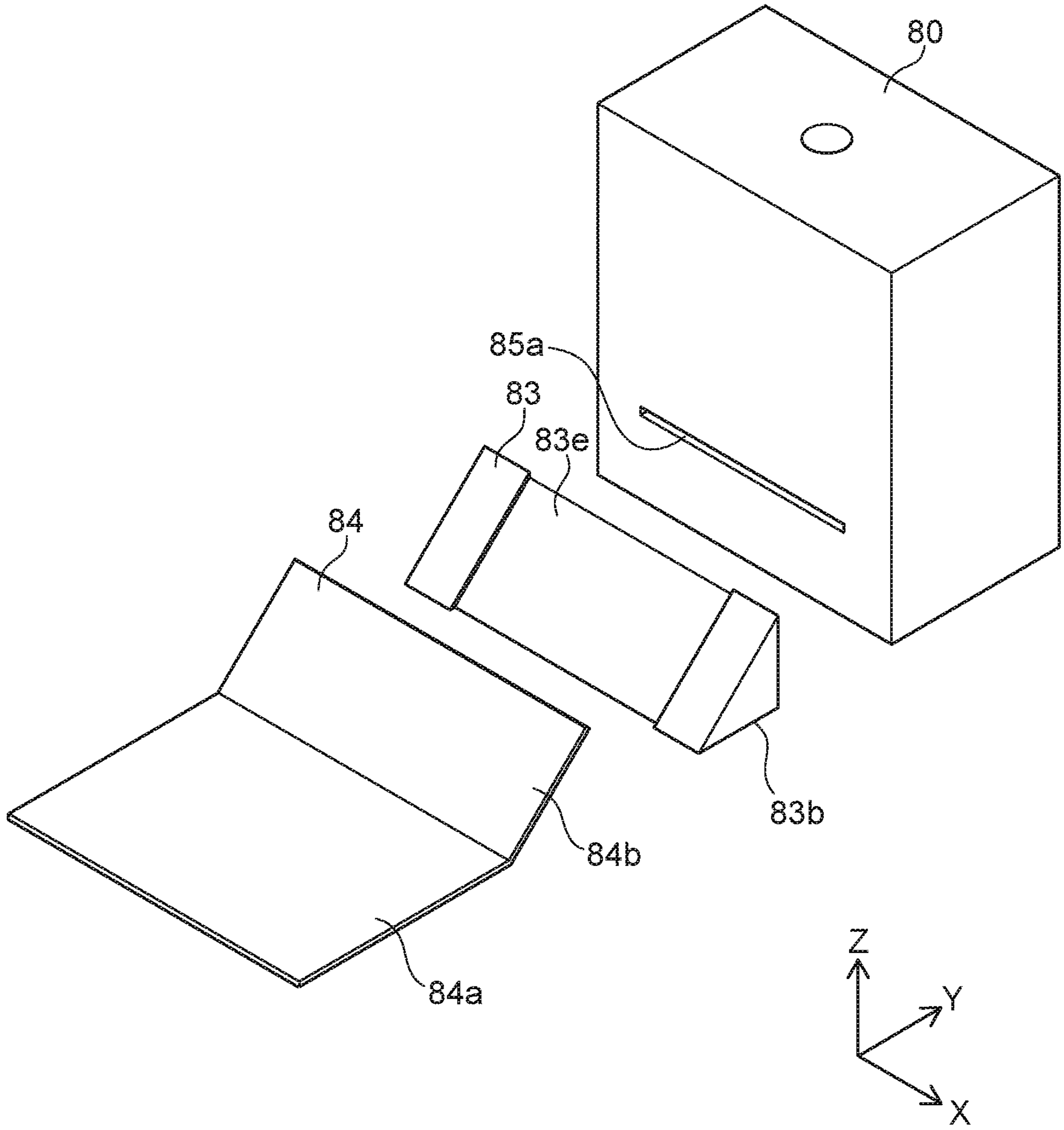
FIG. 7 is a partially exploded view illustrating the coating head of the embodiment.

As shown in FIG. 6, the slit plate 84 includes a bottom surface portion 84*a* and an oblique surface portion 84*b*. The oblique surface portion 84*b* is provided at one end of the bottom surface portion 84*a*. The oblique surface portion 84*b* is provided at the angle θ1 from the bottom surface portion 84*a*. The angle θ1 is equal to the angle between the surface 83*c* and the oblique surface 83*d* of the slit block 83. The length of the oblique surface portion 84*b* is substantially equal to the length of the oblique surface of the slit block 83.

As shown in FIG. 7, the slit block 83 is connected to the lower portion of the back plate 85 of the main body 80. The connection is performed so that the bottom surface of the slit block 83 is in the same plane as the bottom surface of the bottom plate 82 of the main body 80.

The slit plate 84 is connected to the oblique surface of the slit block 83 to cover the oblique surface of the slit block 83 with the oblique surface portion 84*b* of the slit plate 84. The connection is performed so that the bottom surface portion 84*a* of the slit plate 84 is in the same plane as the bottom surface of the slit block 83 and the bottom surface of the bottom plate 82 of the main body 80.

Thereby, the bottom surface portion 84*a* of the slit plate 84, the surface 83*b* of the slit block 83 parallel to the XY plane, and the bottom surface of the bottom plate 82 of the main body 80 form the bottom surface 8*b* of the coating head 8.

The channel portion 83*e* is provided to match the position of the main body slit 85*a*. Accordingly, the guide channel 83*a* of the mist is formed by the channel portion 83*e* being covered with the oblique surface portion 84*b* of the slit plate 84. Thus, the guide channel 83*a* of the mist is at the angle θ1 from the surface of the back plate 85 of the main body 80. In the case where the surface of the back plate 85 is parallel to the vertical direction, the mist that is sprayed from the main body slit 85*a* is guided to the mist outlet 18 at the angle θ1 from the vertical direction. Accordingly, the mist that is sprayed from the mist outlet 18 is sprayed onto the surface of the substrate 9 at the angle θ1 from the vertical direction. For example, the angle θ1 is set to about 45°. The angle θ1 is not limited thereto and is set to an appropriate value according to the source material, the film thickness, and the like of the thin film to be formed.

Thus, because the mist is sprayed onto the surface of the substrate 9 at an angle, the turbulent flow at the surface vicinity can be suppressed more and the film formation can be more uniform than when spraying in the vertical direction.

The components of the coating head 8 are formed of materials that do not corrode due to the source material solution that is used, the cleaning liquid, the replacement gas, etc. For example, the main body 80, the slit block 83, and the slit plate 84 are formed of a metal material. These members can be formed by sheet metal working, casting, etc. The material is not limited to a metal material; and injection molding technology or the like may be used for each component using a synthetic resin, etc.

The operation and the maintenance method of the coating head 8 of the embodiment will now be described.

Figure 8:
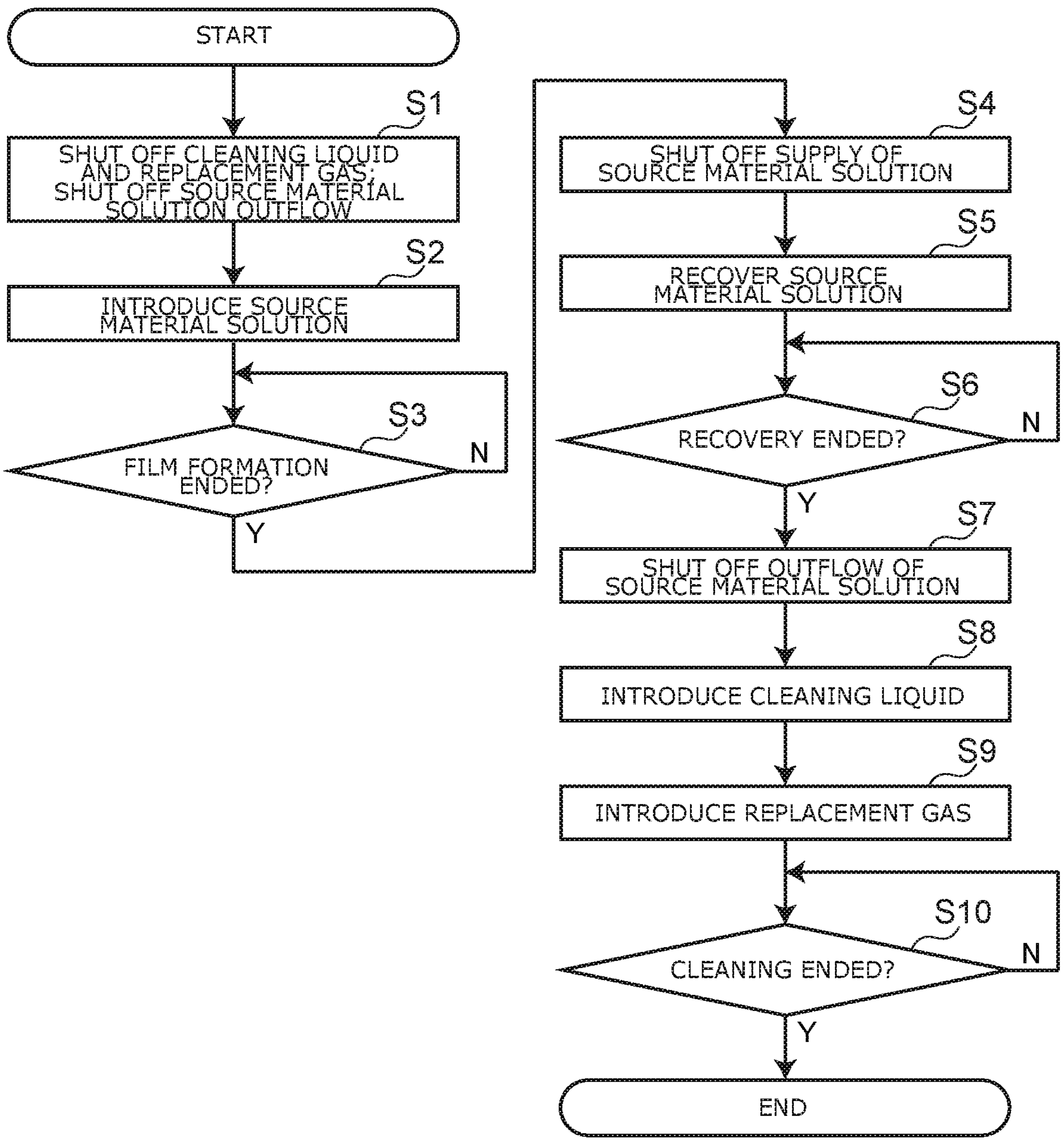
FIG. 8 is a flowchart illustrating the procedure of the operation of the coating head.

FIG. 8 is a flowchart illustrating the procedure of the operation of the coating head.

(Mist Coating Process)

As shown in FIG. 8, when coating the mist in step S1, both a valve 25*b* provided in the cleaning liquid/replacement gas supply line 25 and a valve 26*b* provided in the source material solution recovery line 26 are closed. The introduction of the cleaning liquid and the replacement gas is shut off by the valve 25*b* provided in the cleaning liquid/replacement gas supply line 25. Also, the outflow outside the main body 80 of the source material solution accumulated in the bottom plate 82 is shut off by the valve 26*b* provided in the source material solution recovery line 26.

In step S2, a valve 22*b* that is provided in the mist supply line 22 is opened. The mist of the source material solution generated by the source material solution nebulization mechanism 50 is introduced into the coating head 8 from the supply port 87*a* by the valve 22*b*.

The mist that is introduced into the flow-straightening chamber 80*a* is straightened and dispersed by the current plates 81-1 to 81-4 provided in one stage or multiple stages and reaches the bottom of the flow-straightening chamber 80*a*.

The mist is sprayed from the mist outlet 18 via the guide channel 83*a* from the main body slit 85*a*.

Although the mist is dispersed in the flow-straightening chamber 80*a*, a portion of the mist approaches each other and coalesces. Also, the mist that is not sprayed from the main body slit 85*a* also coalesces. The coalesced mist accumulates as the source material solution at the recovery port 86*a* vicinity due to the slope portions 82*b* and 82*c* of the bottom plate 82.

In step S3, the operation described above is continued until the film formation of the thin film ends. The end of the film formation process is determined based on the film thickness, whether or not the film formation object substrate has reached the prescribed length, etc. In the case where the film formation has ended, the processing transitions to a source material solution recovery process.

(Source Material Solution Recovery Process)

The source material solution that is accumulated on the bottom plate 82 is recovered via the recovery port 86*a* by the source material solution recovery process. First, in step S4, the valve 22*b* of the mist supply line 22 is closed. The valve 25*b* that is provided in the cleaning liquid/replacement gas supply line 25 is still closed. The supply of the source material solution is stopped by the valve 22*b*.

In step S5, the valve 26*b* of the source material solution recovery line 26 is opened. The source material solution that is accumulated inside the coating head 8 is recovered via the source material solution recovery line 26 by the valve 26*b*. For example, the recovered source material solution is fed into the nebulizing container 4 and re-utilized. The source material solution may be recovered by fluidly connecting between the source material solution recovery line 26 and the nebulizing container 4 and by using a pump, etc.

In step S6, the operation described above is continued until the source material solution recovery ends. When the recovery of the source material solution has ended, the processing transitions to a cleaning process of the interior of the coating head. For example, whether or not the recovery of the source material solution has ended can be determined by a level meter detecting the liquid surface of the source material solution at the recovery port 86*a* vicinity, etc. Or, the level of the source material solution may be determined by naked eye by using a pipe made of a transparent resin as the pipe of the source material solution recovery line 26.

(Cleaning Process of Interior of Coating Head)

There are cases where film formation using a mist using another source material solution is performed after recovering the source material solution. In such a case, it is necessary to clean the previously-used source material solution by the cleaning process.

In step S7, the valve 22*b* of the mist supply line 22 and the valve 26*b* of the source material solution recovery line 26 are closed. The supply of the source material solution is shut off by the valve 22*b*. The outflow of the substance accumulated in the interior is shut off by the valve 26*b*. Subsequently, in step S8, the valve 25*b* of the cleaning liquid/replacement gas supply line 25 is opened. The cleaning liquid is introduced via the cleaning liquid/replacement gas supply line 25 by the valve 25*b*. The cleaning liquid is introduced from the supply port 87*a*.

The cleaning liquid that is introduced into the flow-straightening chamber 80*a* cleans the interior wall of the flow-straightening chamber 80*a* including the surfaces of the current plates 81-1 to 81-4. The current plates 81-1 to 81-4 are provided lower than the connection portions of the end portions 81-1*a* to 81-4*a*, Therefore, the cleaning liquid that is introduced cleans the surfaces of the current plates 81-1 to 81-4 and falls downward from each of the end portions 81-1*a* to 81-4*a*, The cleaning liquid that falls downward accumulates on the bottom plate 82.

In step S9, the accumulated cleaning liquid is recovered by opening the valve 26*b* of the source material solution recovery line 26. The recovered cleaning liquid is recovered at a location different from the recovered source material solution.

Subsequently, in step S10, the replacement gas is introduced into the flow-straightening chamber 80*a* via the cleaning liquid/replacement gas supply line 25. The cleaning liquid is dried by the replacement gas so that another source material solution can be introduced.

In step S11, the operation described above is continued until the cleaning process ends. The series of operations ends when the cleaning process ends. For example, the end of the cleaning process is determined according to whether or not a preset time has been reached, etc.

Sequential control of opening and closing of each of the valves 22*b*, 25*b*, and 26*b* and the selective introduction of the cleaning liquid and the replacement gas in each step described above can be performed using a programmable logic controller (PLC), etc.

Further, by using a PLC, the process can be transitioned to the source material solution recovery process when the source material solution accumulated at the bottom plate 82 has reached a prescribed level in the mist coating process; and the process can be transitioned to the cleaning process automatically after recovering the source material solution.

Effects of the coating head of the embodiment will now be described.

In the coating head 8 of the embodiment, the bottom plate 82 of the main body 80 includes the slope portions 82*b* and 82*c*. Because the slope portions 82*b* and 82*c* are provided to have heights becoming lower toward the recovery port 86*a*, the coalesced mist accumulates at the vicinity of the recovery port 86*a* on the bottom plate 82. Therefore, the accumulated source material solution can be recovered from the recovery port 86*a* via the source material solution recovery line 26. Because the recovered source material solution can be re-utilized, the yield of the mist coating film formation apparatus 100 can be increased.

The current plates 81-1 to 81-4 that are provided inside the flow-straightening chamber 80*a* are provided so that the heights of the end portions are lower than the other portions. Therefore, the cleaning liquid that is supplied from the supply port 87*a* at the upper portion falls easily onto the bottom plate 82 therebelow after cleaning the current plates 81-1 to 81-4. Because the inner surface of the bottom plate 82 is set to have a height that is lower toward the recovery port 86*a*, the cleaning liquid for which the cleaning has ended can be recovered easily from the recovery port 86*a*.

Thus, in the coating head 8 of the embodiment, the source material solution can be recovered and the interior of the coating head 8 can be cleaned easily without detaching the coating head 8 from the mist coating mechanism 70 and disassembling the coating head 8. Accordingly, the yield of the manufactured thin-film products can be increased; and the throughput of the manufacturing can be improved.

Further, the coating head 8 of the embodiment includes the slit block 83 and the slit plate 84 forming the guide channel 83*a* at the angle θ1 from the vertical direction. Therefore, the mist that is flow-straightened and dispersed in the flow-straightening chamber 80*a* can be sprayed onto the substrate 9 at the angle θ1 from the vertical direction. By spraying at the angle θ1, the turbulent flow at the surface vicinity of the substrate 9 does not occur easily; and a uniform film thickness can be formed more stably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. A coating head of a mist coating film formation apparatus, comprising a main body, the main body including a top plate, a supply port capable of supplying one of a cleaning liquid or a mist of a source material solution being provided in the top plate, a bottom plate provided below the top plate in a vertical direction, and a sidewall provided between the top plate and the bottom plate, an upper end and a lower end of the sidewall being connected respectively to the top plate and the bottom plate, the sidewall forming an interior space with the top plate and the bottom plate, the sidewall including a slit spraying the mist externally from the interior space, and a recovery port capable of recovering the supplied cleaning liquid or a mist coalescing in the interior space, the bottom plate including a sloped surface having a height becoming lower from an inner perimeter of the sidewall toward the recovery port.

2. The coating head according to claim 1, wherein the slit is provided along a first direction crossing the vertical direction at a position higher than a highest position of the sloped surface.

3. The coating head according to claim 1, wherein the main body includes a first current plate connected to the sidewall in the interior space, the first current plate having a plate configuration and being open at a first end portion, the first end portion being an end portion of the first current plate, the sidewall includes a first wall portion where the slit is formed, the first wall portion being parallel to a plane including the vertical direction and a first direction crossing the vertical direction, the first current plate extends from the first wall portion toward the first end portion, and the first end portion is provided at a position having a height lower than a height of another portion of the first current plate.

4. The coating head according to claim 3, wherein the slit is provided along the first direction, and the end portion is provided along the first direction.

5. The coating head according to claim 3, wherein the sidewall includes a second wall portion provided at a position opposing the first wall portion, and the coating head further comprises a second current plate extending from the second wall portion toward the first wall portion and including a second end portion, the second end portion being an end portion of the second current plate provided higher than the first end portion.

6. The coating head according to claim 1, wherein the mist sprayed from the slit is sprayed at a prescribed angle from the vertical direction.

7. The coating head according to claim 6, further comprising a mist guide member including a guide channel guiding the mist sprayed from the slit, the guide channel being formed at the prescribed angle.

8. A maintenance method of a coating head, the maintenance method being of maintenance of the coating head of a mist coating film formation apparatus, the mist coating film formation apparatus including a main body, the main body including:

a top plate, a supply port capable of supplying one of a cleaning liquid or a mist of a source material solution being provided in the top plate;

a bottom plate provided below the top plate in a vertical direction; and a sidewall provided between the top plate and the bottom plate, an upper end and a lower end of the sidewall being connected respectively to the top plate and the bottom plate, the sidewall forming an interior space with the top plate and the bottom plate, the sidewall including:

a slit spraying the mist externally from the interior space; and a recovery port capable of recovering the supplied cleaning liquid or a mist coalescing in the interior space, the bottom plate including a slope having a height becoming lower from an inner perimeter of the sidewall toward the recovery port, the maintenance method comprising:

stopping a supply of the mist by closing a supply valve of the supply port;

recovering the coalesced mist by opening a recovery valve of the recovery port;

stopping the recovering of the mist by closing the recovery valve;

supplying the cleaning liquid by opening the supply valve; and supplying a replacement gas by maintaining the opening of the supply valve after stopping the supplying of the cleaning liquid.

* * * * *